(12) United States Patent
Zhou

(10) Patent No.: US 12,386,090 B2
(45) Date of Patent: Aug. 12, 2025

(54) SYSTEM AND METHOD FOR RESERVOIR STRUCTURE CHARACTERIZATION

(71) Applicant: Chevron U.S.A. Inc., San Ramon, CA (US)

(72) Inventor: Yijie Zhou, Richmond, TX (US)

(73) Assignee: CHEVRON U.S.A. INC.

( * ) Notice: Subject to any disclaimer, the term of this patent is extended or adjusted under 35 U.S.C. 154(b) by 246 days.

(21) Appl. No.: 18/156,229

(22) Filed: Jan. 18, 2023

(65) Prior Publication Data

US 2024/0241278 A1    Jul. 18, 2024

(51) Int. Cl.
G01V 1/34 (2006.01)
G01V 1/28 (2006.01)
G01V 20/00 (2024.01)

(52) U.S. Cl.
CPC ............... G01V 1/34 (2013.01); G01V 1/282 (2013.01); *G01V 20/00* (2024.01); *G01V 2210/614* (2013.01)

(58) Field of Classification Search
CPC .......... G01V 1/34; G01V 1/282; G01V 20/00; G01V 2210/614
USPC .......................................................... 702/16
See application file for complete search history.

(56) References Cited

U.S. PATENT DOCUMENTS

| | | | |
|---|---|---|---|
| 10,816,687 B2 | 10/2020 | Sain | |
| 10,942,293 B2 | 3/2021 | Wiener | |
| 2018/0052249 A1* | 2/2018 | Chen | G01V 20/00 |
| 2018/0292552 A1* | 10/2018 | Ramsay | G01V 1/50 |
| 2019/0049612 A1* | 2/2019 | Padhi | G01V 1/42 |
| 2020/0309979 A1* | 10/2020 | Wang | G06N 3/08 |
| 2021/0255347 A1* | 8/2021 | Palmer | G06N 5/01 |
| 2022/0099851 A1* | 3/2022 | Widatalla | G01V 1/32 |

FOREIGN PATENT DOCUMENTS

CN        103033846 B        6/2016

OTHER PUBLICATIONS

Y. Zhou et al., "Applying Seismic Inversion to Characterize the Leviathan Reservoir Structure: Levant Basin, Offshore Israel." EAGE Extended Abstract, Third EAGE Eastern Mediterranean Workshop, Dec. 1-3, 2021, Larnaca Cyprus & Online.

(Continued)

*Primary Examiner* — Paul D Lee
(74) *Attorney, Agent, or Firm* — Marie L. Clapp

(57) ABSTRACT

A method is described for reservoir structure characterization including obtaining well logs and seismic data; performing facies classification and stratigraphic sequencing on the well logs to identify a plurality of layers; estimating wavelets from the seismic data and using the wavelets to tie synthetic seismograms from well logs to the seismic data; determining a mean value for each elastic property in each layer of the well logs and assigning the mean value to each layer to generate blocky well logs; using the wavelets to attempt to tie synthetic seismograms from the blocky well logs to the seismic data; defining facies-dependent properties based on the blocky well logs; performing global optimization using the facies-dependent properties and the seismic data to find thicknesses of the layers across the volume of interest; and mapping the reservoir structure based on the global optimization to generate a graphical representation of the reservoir structure.

4 Claims, 14 Drawing Sheets

(56) References Cited

OTHER PUBLICATIONS

Yijie Zhou et al., "Improved Estimation of Elastic Attributes from Pre-Stack Seismic Data for Reservoir Characterization," Geophysics, vol. 85, No. 1, Jan.-Feb. 2020, pp. R41-R53.
Mrinal K. Sen et al., "Transdimensional Seismic Inversion Using the Reversible Jump Hamiltonian Monte Carloalgorithm," Geophysics, vol. 82, No. 3, May-Jun. 2017, pp. R119-R134.
Michael Kemper et al., "Joint Impedance and Facies Inversion-Seismic Inversion Redefined," First Break, vol. 32, Sep. 2014, pp. 89-95.
Miguel Bosch et al., "Seismic Inversion for Reservoir Properties Combining Statistical Rock Physics and Geostatistics: A Review," Geophysics, vol. 75, No. 5, Sep.-Oct. 2010, pp. 75A165-75A176.
David D. Jackson, "The Use of a Priori Data to Resolve Non-Uniqueness in Linear Inversion." Geophys. J. R. Astr. Soc, 57, pp. 137-157; Downloaded from https://academic.oup.com/gji/article/57/1/137/715373 by guest on Jan. 17, 2023.
Ahsan Zabihi Naeini et al., "Quantitative Interpretation Using Facies-Based Seismic Inversion." Interpretation, Aug. 2017, vol. 5, No. 3, pp. SL1-SL8.

\* cited by examiner

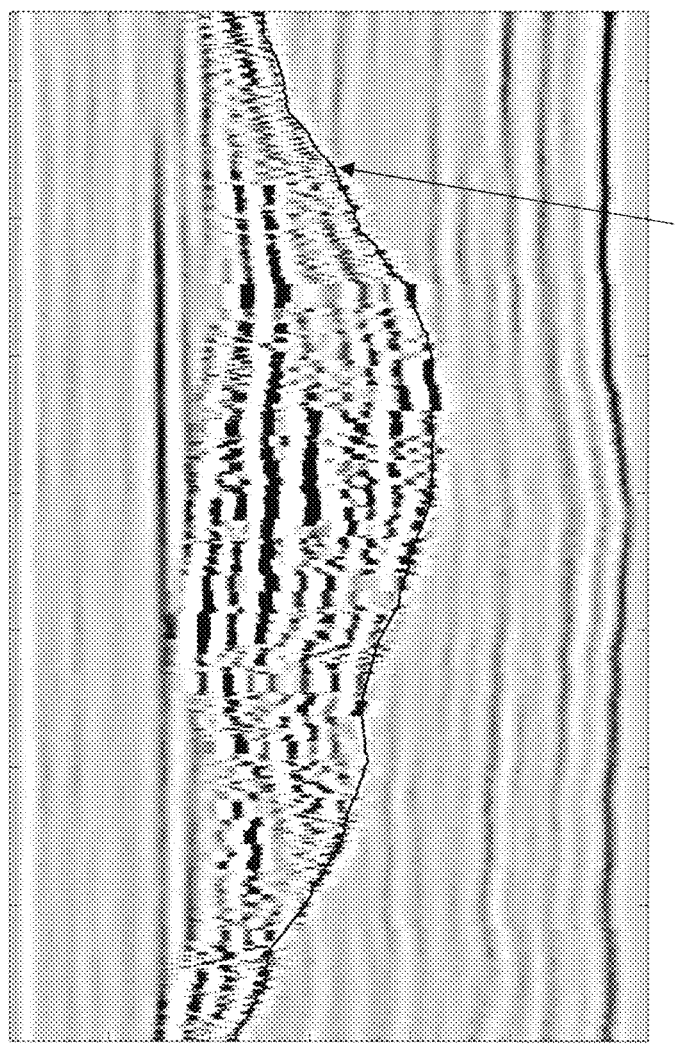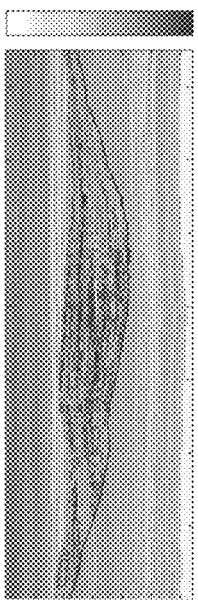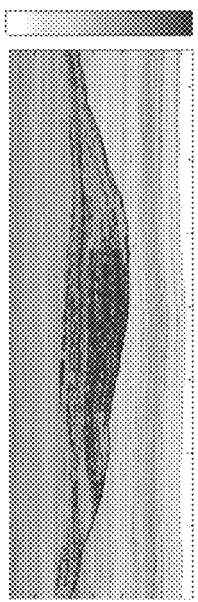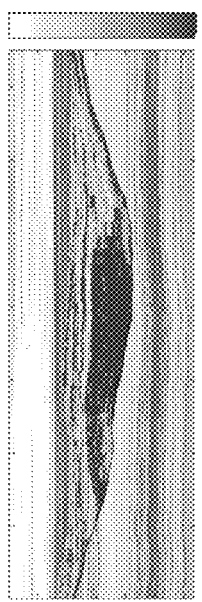
FIG. 3

Synthetic Model with Noise
- Noise can be added to the synthetic data to test if the method can tolerate the noisy seismic data.
- Below shows the clean data vs. noisy data (SNR = 2)
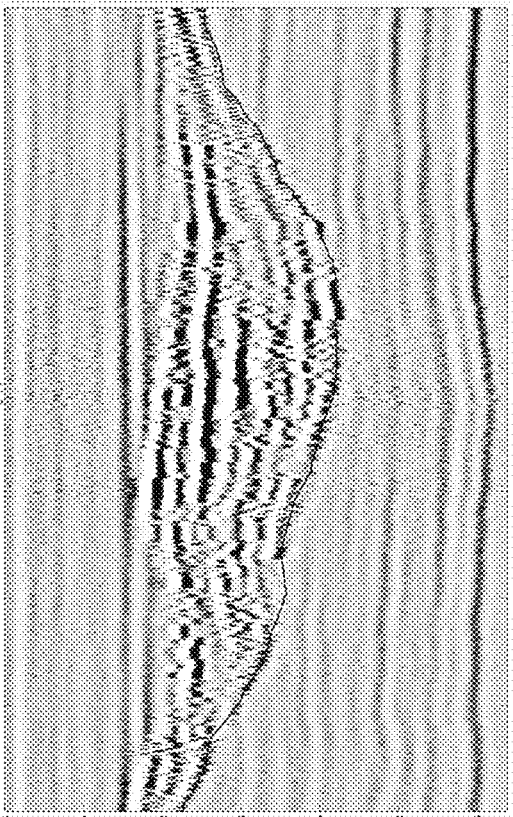
Noisy Synthetic stack image
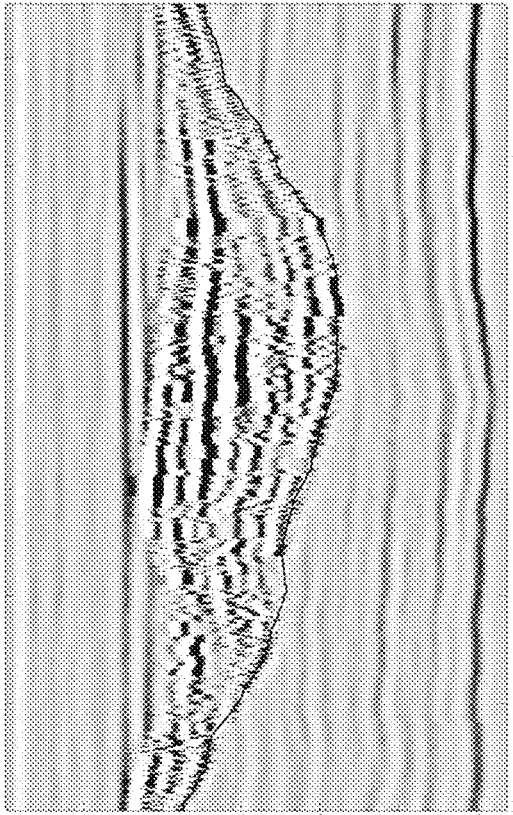
Clean Synthetic stack image
FIG. 10

SYSTEM AND METHOD FOR RESERVOIR STRUCTURE CHARACTERIZATION

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for hydrocarbon reservoir structure characterization. In particular, the technique is a facies-constrained inversion for use in subsurface regions with wide, largely continuous shale and sand layers.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. In some cases, this is done as a process called seismic inversion, in which the seismic data and information about the subsurface properties such as velocity are used to infer the subsurface structures. Typically, the low frequency seismic data cannot allow the direct mapping of the structure surface based on the reflection image, especially for the thin layers that are below the seismic tuning thickness. Accurate subsurface reservoir structure characterization relies on the seismic inversion and interpretation. With the seismic inversion, we can derive the intra-layer rock properties from the inter-layer reflections, then followed by rock physics analysis with the inverted rock properties, finally the interpreters will map the structure surfaces based on some inverted properties which are decided from the rock physics analysis, like impedance or Vp/Vs (P-wave velocity/S-wave velocity) ratio.

However, seismic inversion is an ill-posed problem (under-determined problem), which means many possible model parameters can fit the data equally with the desired accuracy. Additionally, conventional inversion algorithms are very sensitive to the input background model, or initial model, and some parameters. The inversion results may change significantly with different parameterizations, thus bringing another challenge for seismic inversion and interpretation.

The inversion results also suffer from the low frequency nature of the seismic data, thus will lose the high frequency component of the data. Correspondingly, the inverted properties will lose the sharp contrast between different lithofacies/geological units, that is observed from well log data (hundreds or even thousands of Hz). The interpreters must rely on their observations at the wells and their geological expectations to pick/map the structure surfaces across the whole field, which is a subjective process.

The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, preventing subsurface integrity issues by planning proper casing and cementation strategies, and selecting and purchasing appropriate completion and production equipment.

There exists a need for an efficient seismic inversion that is stable and not sensitive to parameterization and input models in order to improve hydrocarbon reservoir structure characterization.

SUMMARY

In accordance with some embodiments, a method of reservoir structure characterization including obtaining well logs and seismic data representative of a subsurface volume of interest including a reservoir structure; performing facies classification and stratigraphic sequencing on the well logs to identify a plurality of layers; estimating wavelets from the seismic data and using the wavelets to tie synthetic seismograms from well logs to the seismic data; determining a mean value for each elastic property in each of the plurality of layers of the well logs and assigning the mean value to each of the plurality of layers to generate blocky well logs; using the wavelets to attempt to tie synthetic seismograms from the blocky well logs to the seismic data; defining facies-dependent properties based on the blocky well logs; performing global optimization using the facies-dependent properties and the seismic data to find thicknesses of the layers across the subsurface volume of interest; mapping the reservoir structure based on the global optimization to generate a graphical representation of the reservoir structure; and displaying the graphical representation on a graphical display is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIG. 3 illustrates an example of a step in a method for reservoir structure characterization;

FIG. 10 illustrates an example of a step in a method for reservoir structure characterization;

Like reference numerals refer to corresponding parts throughout the drawings.

DETAILED DESCRIPTION OF EMBODIMENTS

Described below are methods, systems, and computer readable storage media that provide a manner of reservoir structure characterization. These embodiments are designed to be of particular use for facies-constrained inversion for use in subsurface regions with wide, largely continuous shale and sand layers. By introducing the prior-defined facies dependent properties, we can convert a typical inversion algorithm to a reservoir structure optimization problem. The optimization process only solves for the thickness of each pre-defined geological units/lithofacies, instead of the rock properties of each sample within the inversion window as conventional inversion must, thus reduce hundreds or thousands of unknowns to tens of unknowns, or even less, based on the local stratigraphic sequence. This will not only stabilize the inversion algorithm by converting the under-determined problem into an over-determined problem, but also leads to a clear layer structure characterization because of the blocky nature of the inverted models.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Figure 1:
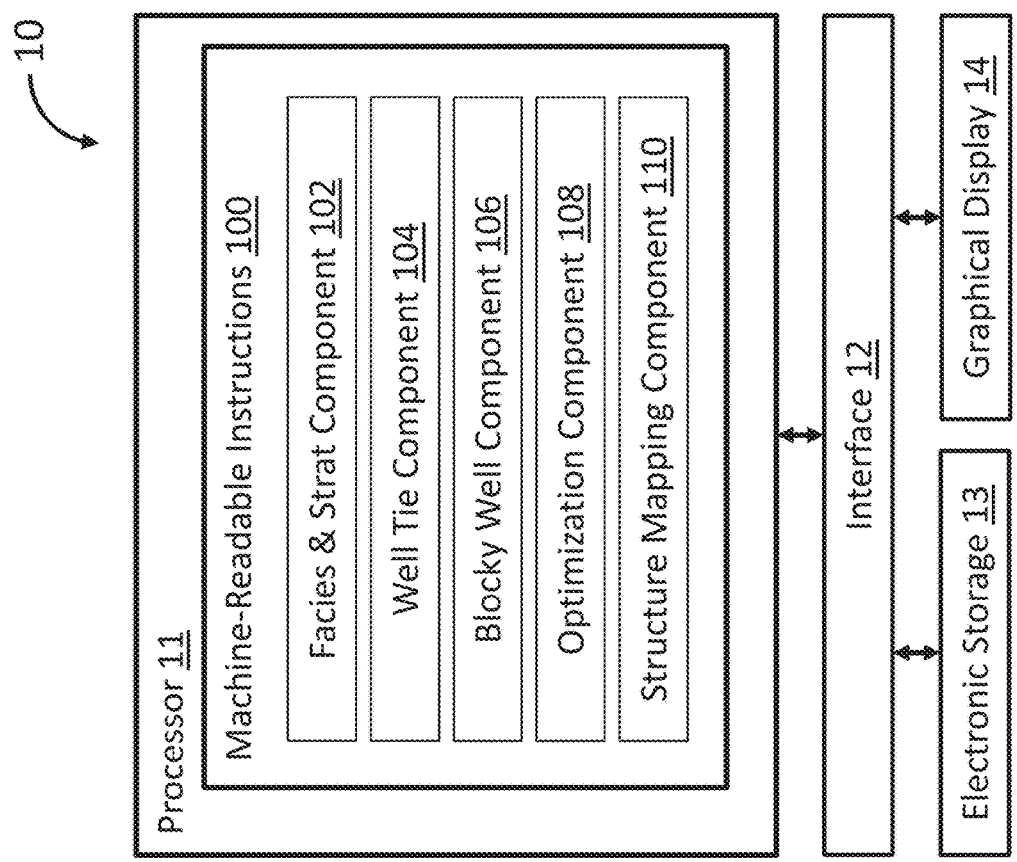
FIG. 1 illustrates an example system for reservoir structure characterization.

The methods and systems of the present disclosure may be implemented by a system and/or in a system, such as a system 10 shown in FIG. 1. The system 10 may include one or more of a processor 11, an interface 12 (e.g., bus, wireless interface), an electronic storage 13, a graphical display 14, and/or other components. Processor 11 receives seismic data and well logs and generates a map of the subsurface structure including the hydrocarbon reservoir.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to reservoir structure characterization, seismic data, well logs, and/or other information. The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

The graphical display 14 may refer to an electronic device that provides visual presentation of information. The graphical display 14 may include a color display and/or a non-color display. The graphical display 14 may be configured to visually present information. The graphical display 14 may present information using/within one or more graphical user interfaces. For example, the graphical display 14 may present information relating to seismic data, well logs, subsurface structures, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate reservoir structure characterization. The machine-readable instructions 100 may include one or more computer program components. The machine-readable instructions 100 may include a facies and stratigraphy component 102, a well tie component 104, a blocky well component 106, an optimization component 108, a structure mapping component 110, and/or other computer program components.

It should be appreciated that although computer program components are illustrated in FIG. 1 as being co-located within a single processing unit, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

Referring again to machine-readable instructions 100, the facies and stratigraphy component 102 may be configured to perform stratigraphic sequencing, facies classification, and rock physics analysis based on the well logs.

The well tie component 104 may be configured to tie the wells to the seismic data. It will also estimate wavelets.

The blocky well component 106 may be configured to assign the mean value of every elastic property within each facies/geologic unit. It will also check the well tie with the blocky well logs; if the well tie is compromised, go back to the facies and stratigraphy component 102 and well tie component 104 to adjust the facies classification, wavelets, etc., to make sure the blocky wells can also tie to the seismic.

The optimization component 108 may be configured to run a global optimization algorithm, such as a genetic algorithm (GA), to find the optimal thickness for each stratigraphic unit that can match with seismic data with the pre-defined facies dependent properties.

The structure mapping component 110 may be configured to map the structure surface based on the inverted stratigraphic sequence.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

Figure 2:
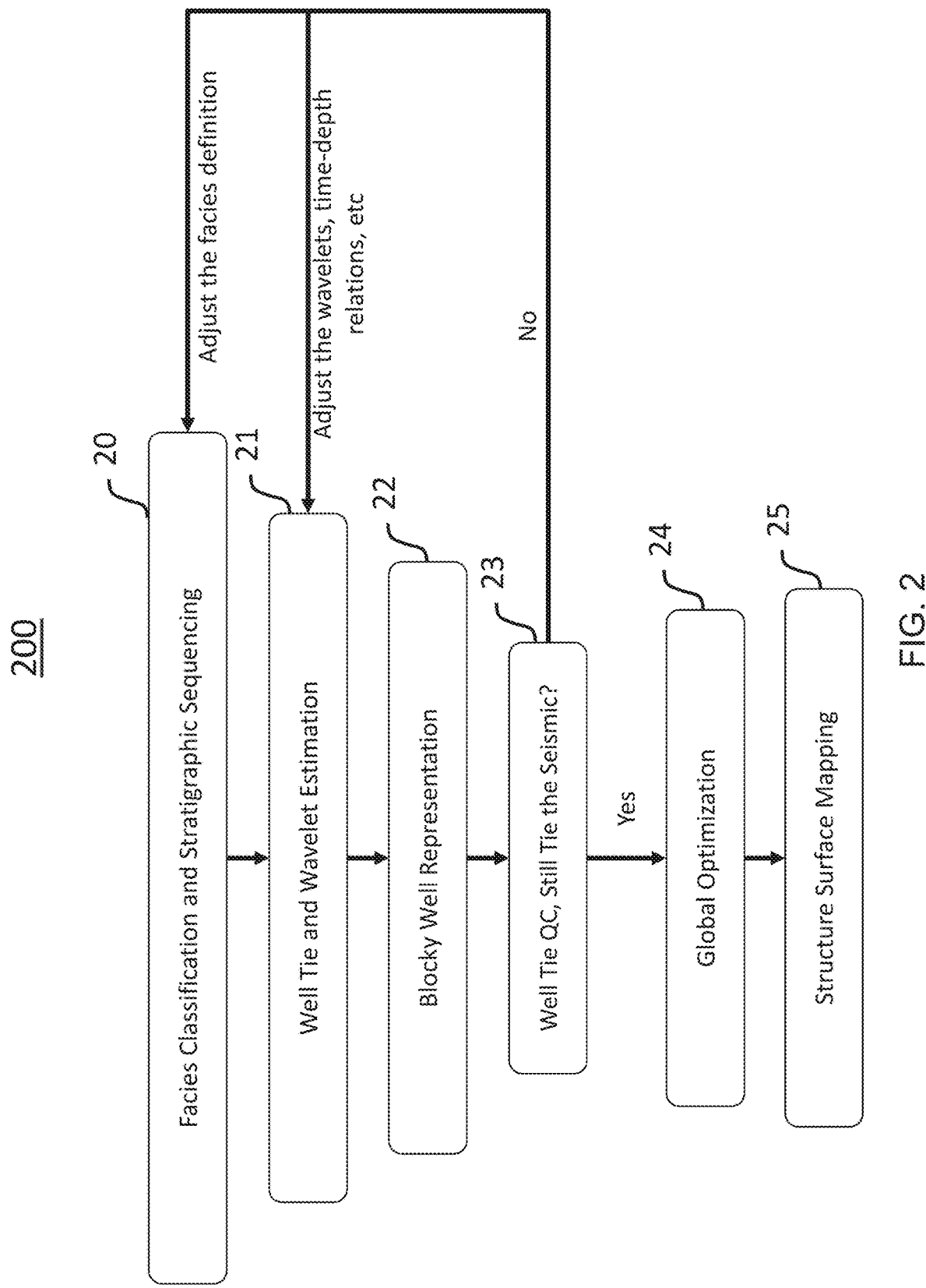
FIG. 2 illustrates an example method for reservoir structure characterization.
Figure 4:
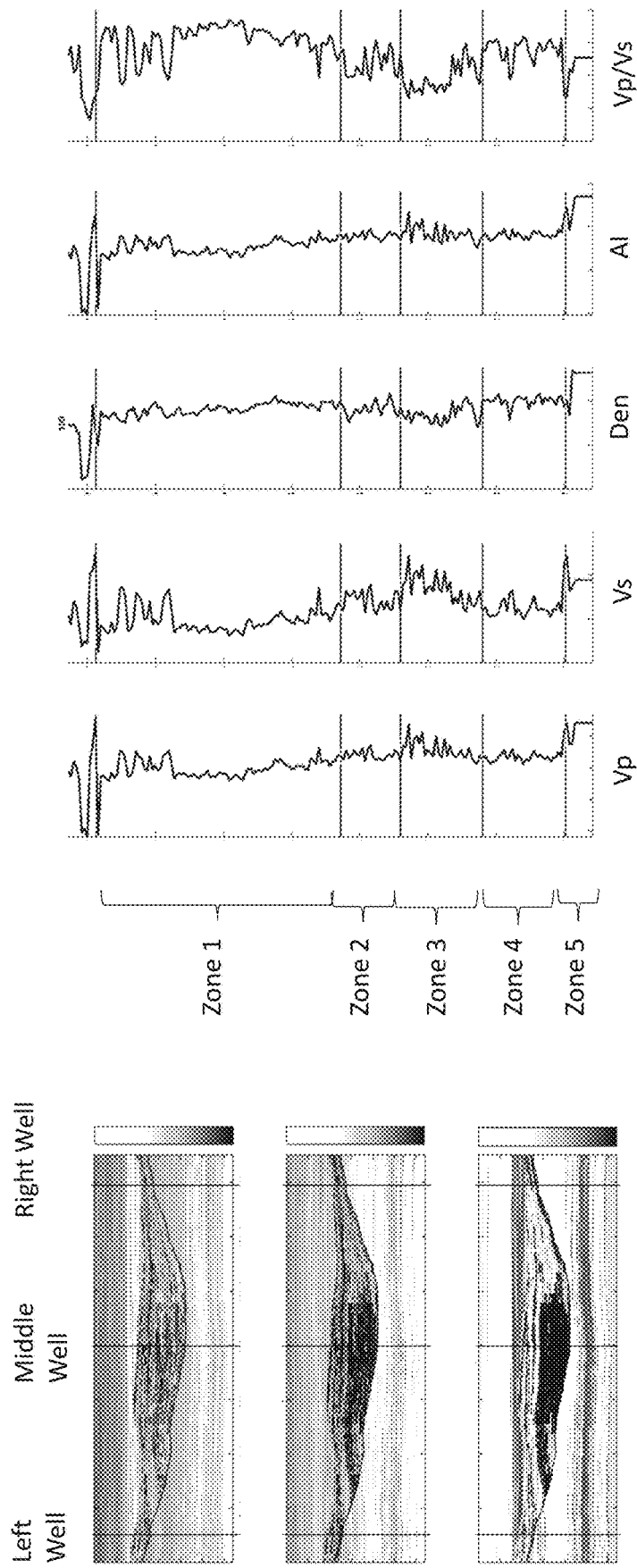
FIG. 4 illustrates an example of a step in a method for reservoir structure characterization.

FIG. 2 illustrates an example process 200 for reservoir structure characterization. The method receives well logs including velocity, density, and impedance logs from any available wells in the volume of interest. It also receives a seismic dataset representative of the subsurface volume of interest. Examples of these input data can be seen in FIG. 3. At step 20, facies classification and stratigraphic sequencing is performed. For the well data, the elastic logs (velocity, density, impedance) should be processed and calibrated, and the detailed petrophysical evaluation should be completed with a suite of petrophysical properties (fluid, lithology, porosity etc.). If there is a geological trend for the elastic properties, vertically or laterally, this step will detrend the well data first. The lithofacies are classified based on petrophysical and elastic properties of the rock samples such that the same facies have similar properties but are significantly different from other rock samples from different facies. Thus, each lithofacies could be correlated with its elastic responses through analysis of the statistics and distribution of each elastic properties. FIG. 4 shows an example of the facies classification and stratigraphic sequencing where 5 different zones are identified. FIG. 4 includes a P-wave velocity ($V_P$) log, an S-wave velocity ($V_S$) log, a density ($\rho$) log, an acoustic impedance (AI) log, and a $V_P/V_S$ log.

Referring again to FIG. 2, step 21 performs well tie and wavelet estimation. The time-depth relation at each well should be calibrated to the VSP (vertical seismic profile) or checkshot, if any, and consistent with the existing velocity model, which is used to convert the inversion model from time to depth. A suite of elastic reflection series in time could be constructed first based on the well log data, which is then convolved with the prior wavelets to construct the synthetic seismogram. The wavelets are then adjusted iteratively until the constructed synthetic seismogram matches with the seismic data with a desired accuracy. The final wavelets are the inputs for seismic inversion, which are estimated based on the well data with calibrated time-depth relations.

Figure 5:
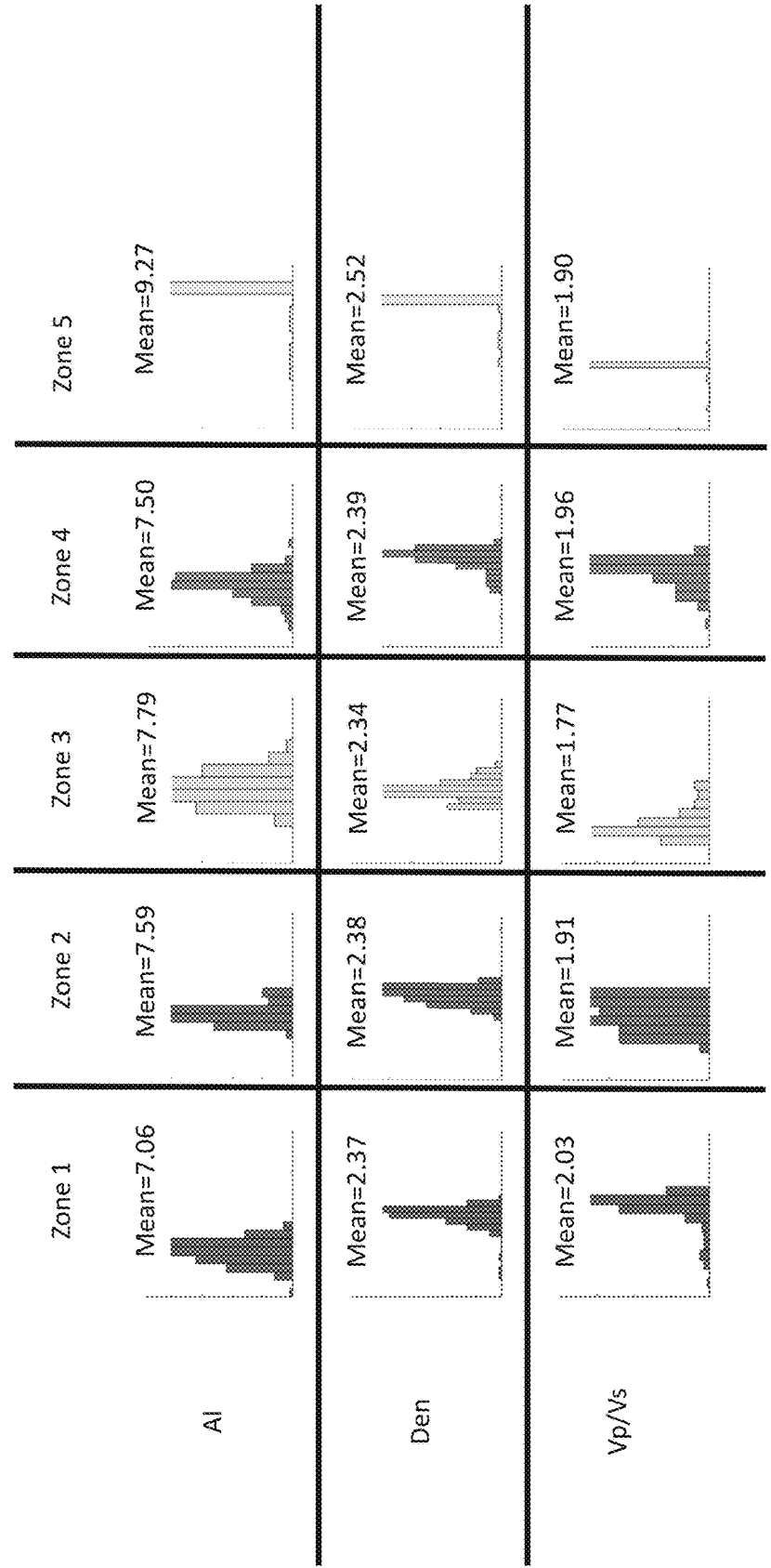
FIG. 5 illustrates an example of a step in a method for reservoir structure characterization.

Step 22 creates a blocky well representation of the well logs. To do this, the method assigns the mean value of every elastic property within each facies, thus the well logs will be blocky since each layer/facies only has a constant value. FIG. 5 shows how some of the elastic properties (AI, density, and $V_P/V_S$) for each zone are calculated and the mean value found so it can be assigned to the entire layer. These blocky wells are checked at step 23 to determine if they still tie to the seismic data. If they do not tie, this may suggest that the blocky well log from initial facies classification cannot represent all or most of the major reflection series that occur in the original well logs, or the wavelets or time-depth relations need to be adjusted. Therefore, the method will repeat steps 20 and 21 to adjust the blocky well representation until it does tie to the seismic. If it does tie, the method proceeds to step 24.

Figure 6:
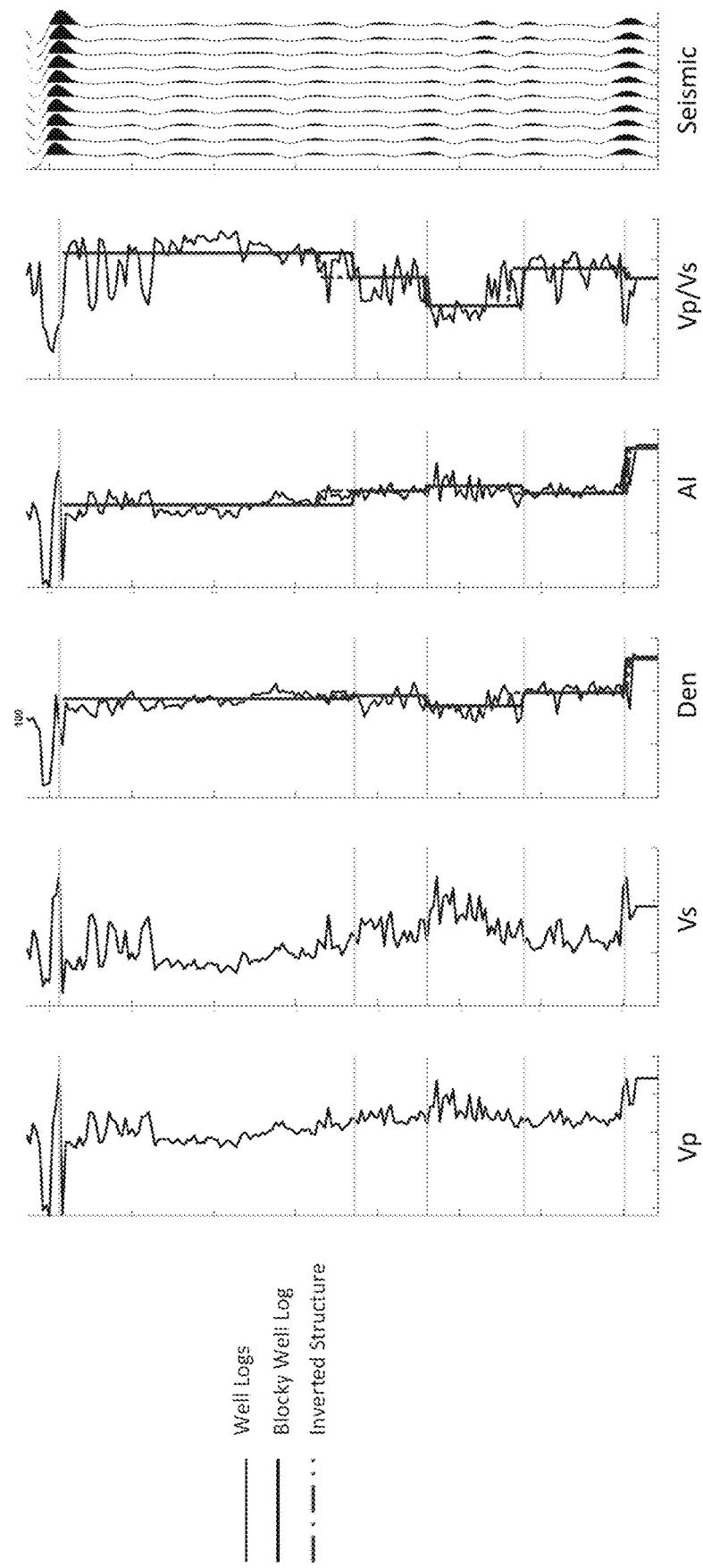
FIG. 6 illustrates an example of a result from a method for reservoir structure characterization.
Figure 7:
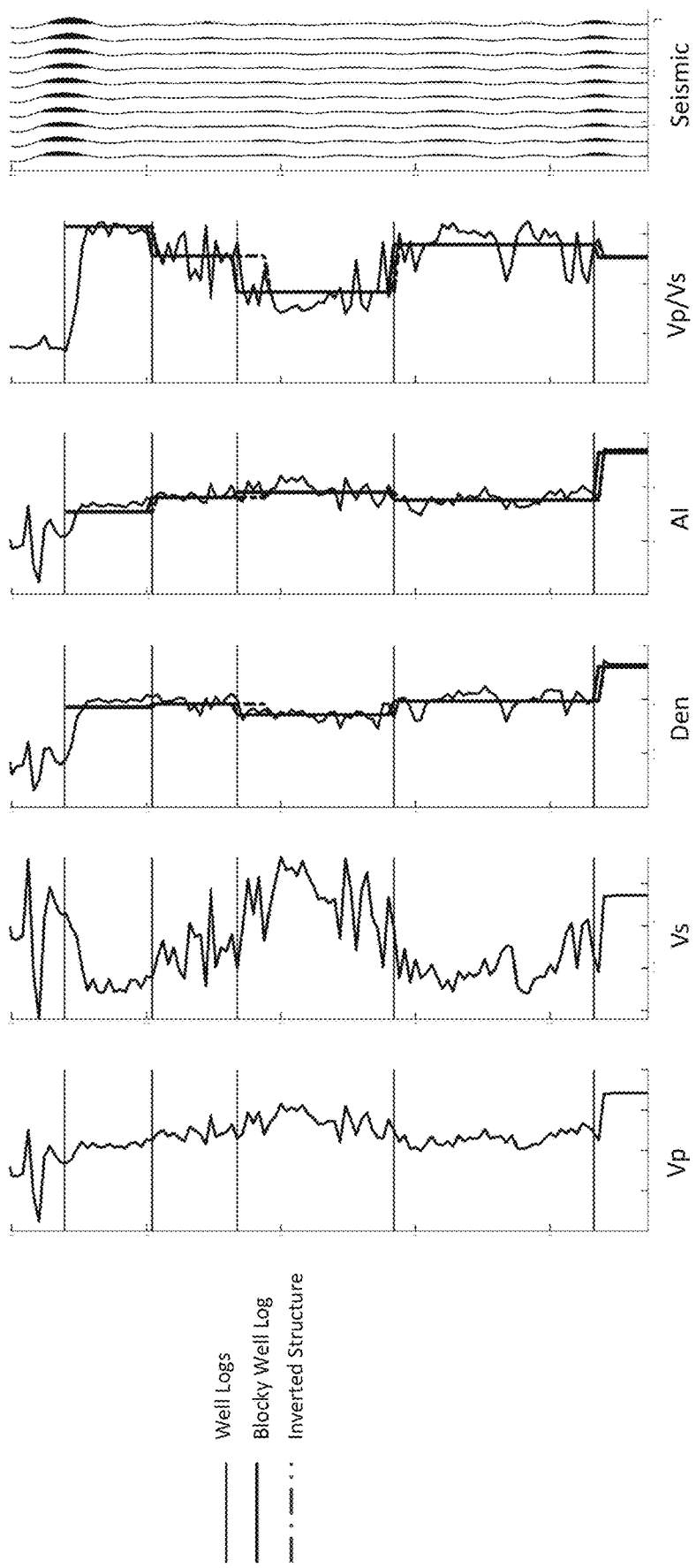
FIG. 7 illustrates an example of a result from a method for reservoir structure characterization.
Figure 8:
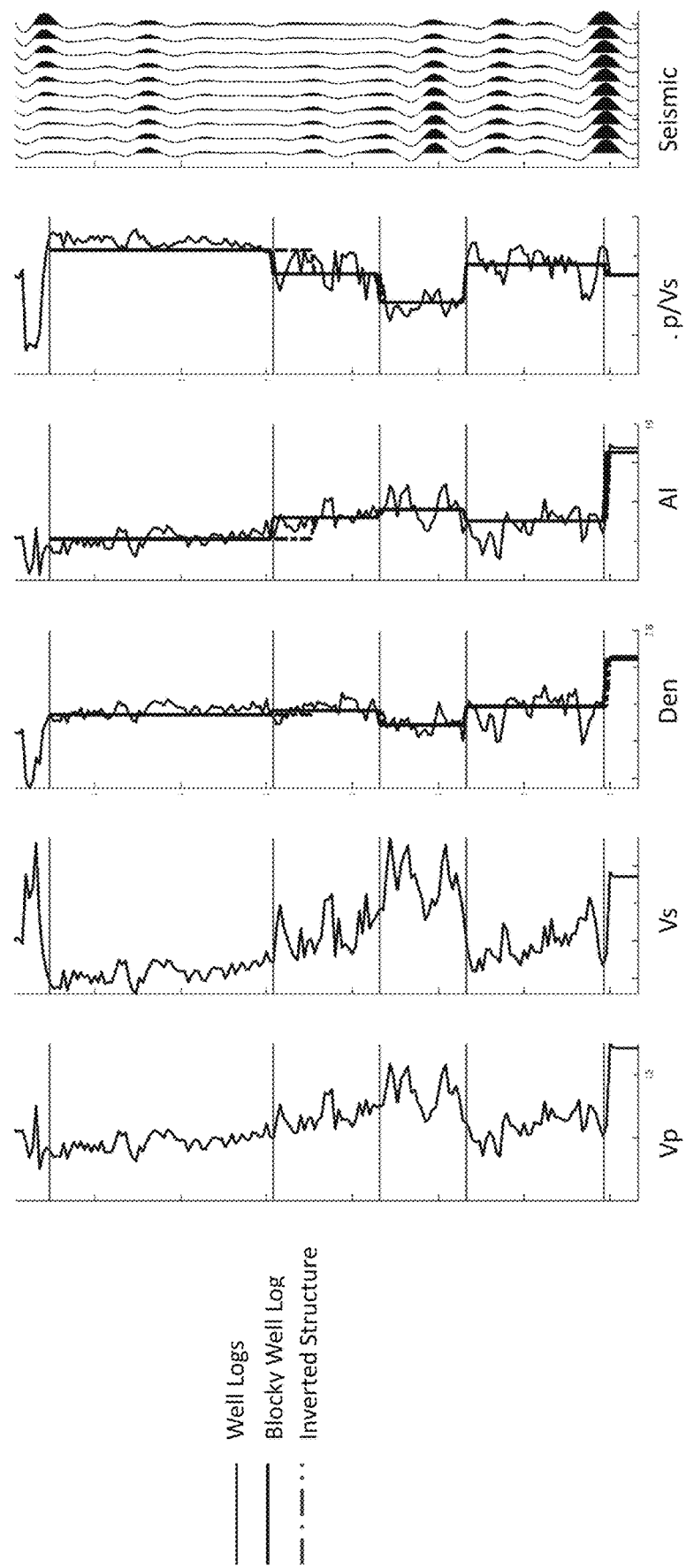
FIG. 8 illustrates an example of a result from a method for reservoir structure characterization.

At step 24, the method performs a global optimization, such as a genetic algorithm, to find the optimal thickness for each stratigraphic units (e.g. lithofacies, geologic layer) that can match with seismic data with the pre-defined facies-dependent properties. The facies obtained from step 20, examples of facies definitions could be found in FIG. 4, while the facies-dependent properties are essentially the mean of the properties for all the rock samples with same facies, which is produced at Step 22, the examples could be found in FIG. 4 and FIG. 5. The objective function is defined as the correlation of synthetic seismogram and actual seismic data, the optimization algorithm searches for the optimal solutions which could maximize this objective function. This will significantly reduce the computing time since it only solves the thickness of the pre-defined layers, which is at least two order of magnitude reduction of the solution domain, compared to the conventional inversion algorithms. FIG. 6, FIG. 7, and FIG. 8 show an example of the inversion result compared with the well logs and blocky well representations for the well locations shown in FIG. 4.

Figure 9:
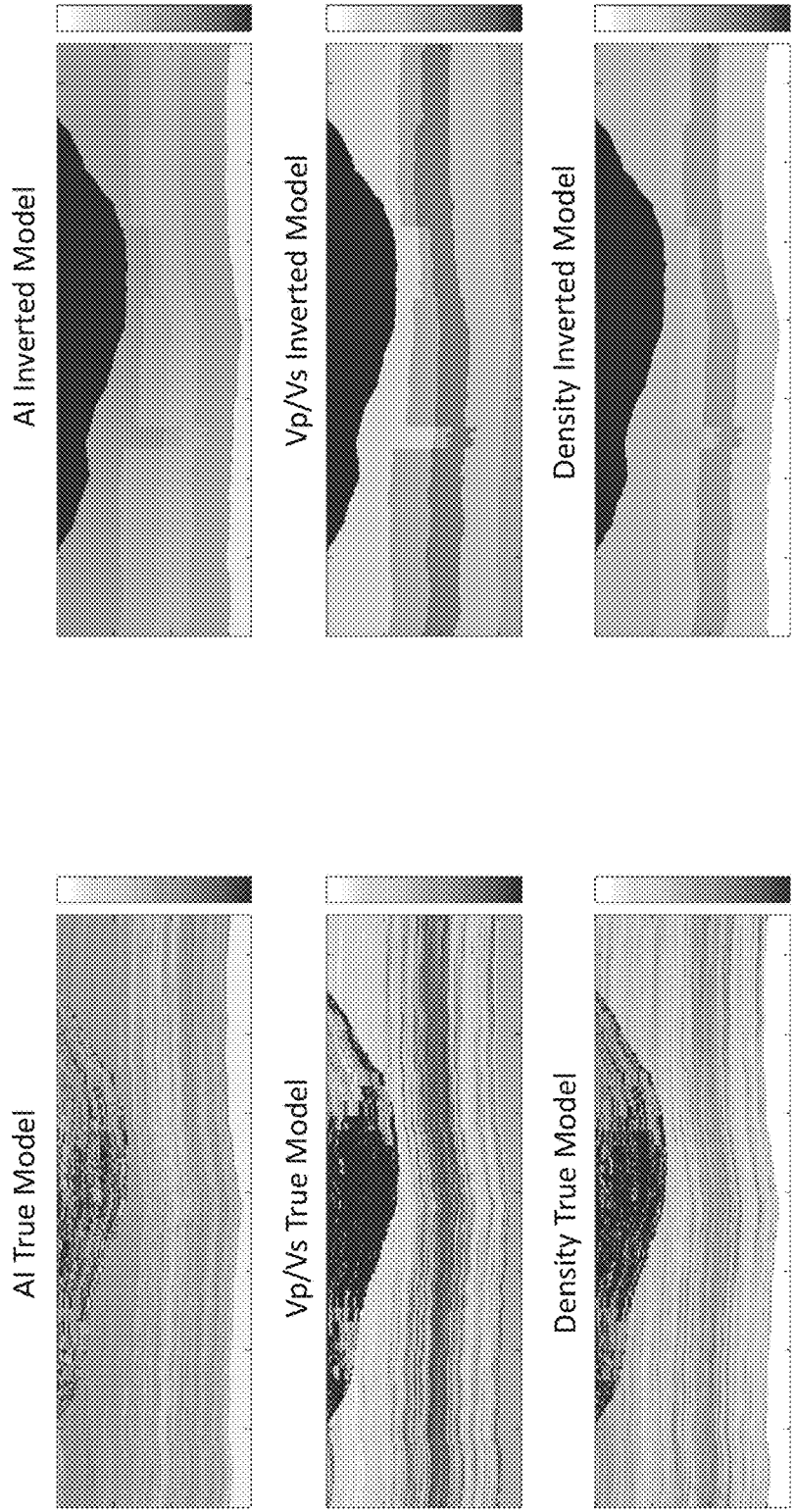
FIG. 9 illustrates an example of a result from a method for reservoir structure characterization.

Referring again to method 200 in FIG. 2, step 25 performs structure surface mapping. The results of the global optimization from step 24 are connected across the volume of interest. This is demonstrated in FIG. 9 which compares the true models with the result of method 200 for the example shown in FIGS. 3-8.

Figure 11:
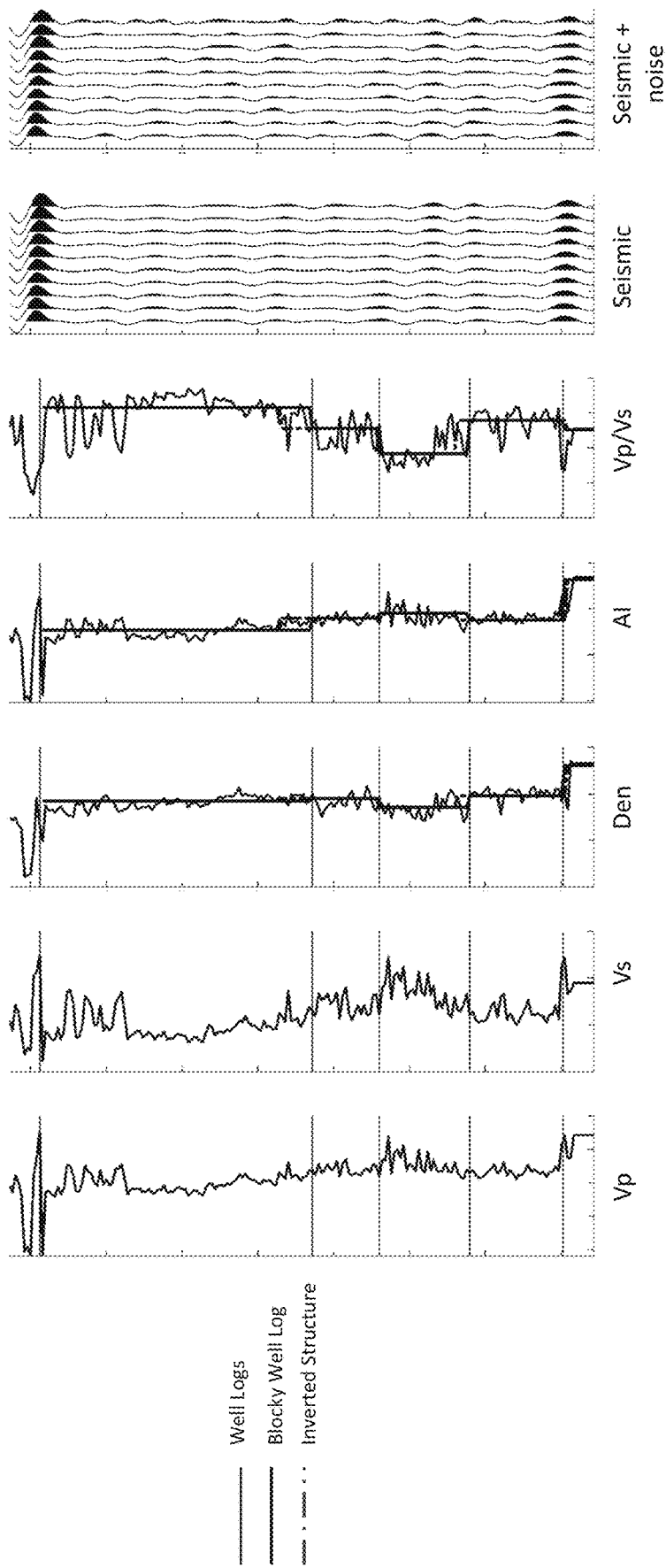
FIG. 11 illustrates an example of a result from a method for reservoir structure characterization.
Figure 12:
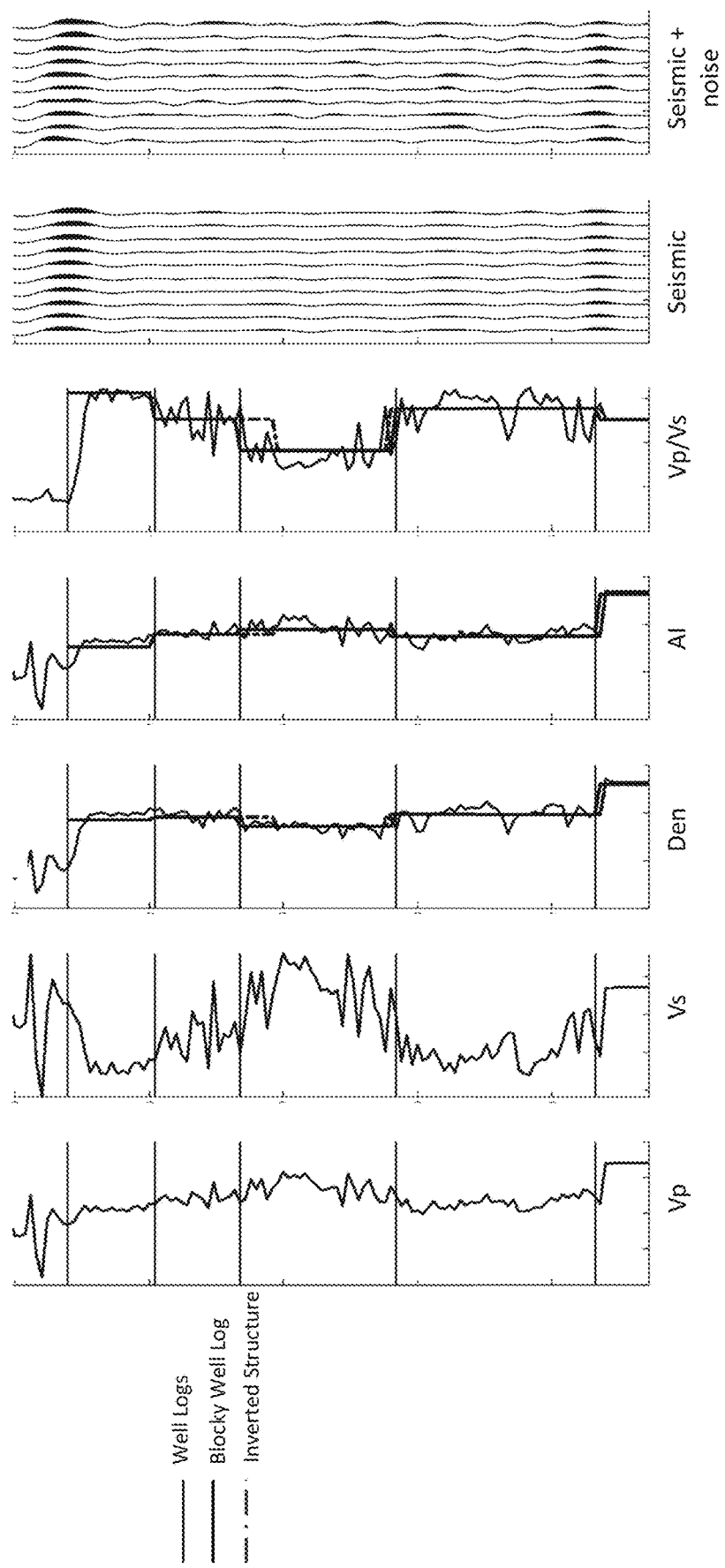
FIG. 12 illustrates an example of a result from a method for reservoir structure characterization.
Figure 13:
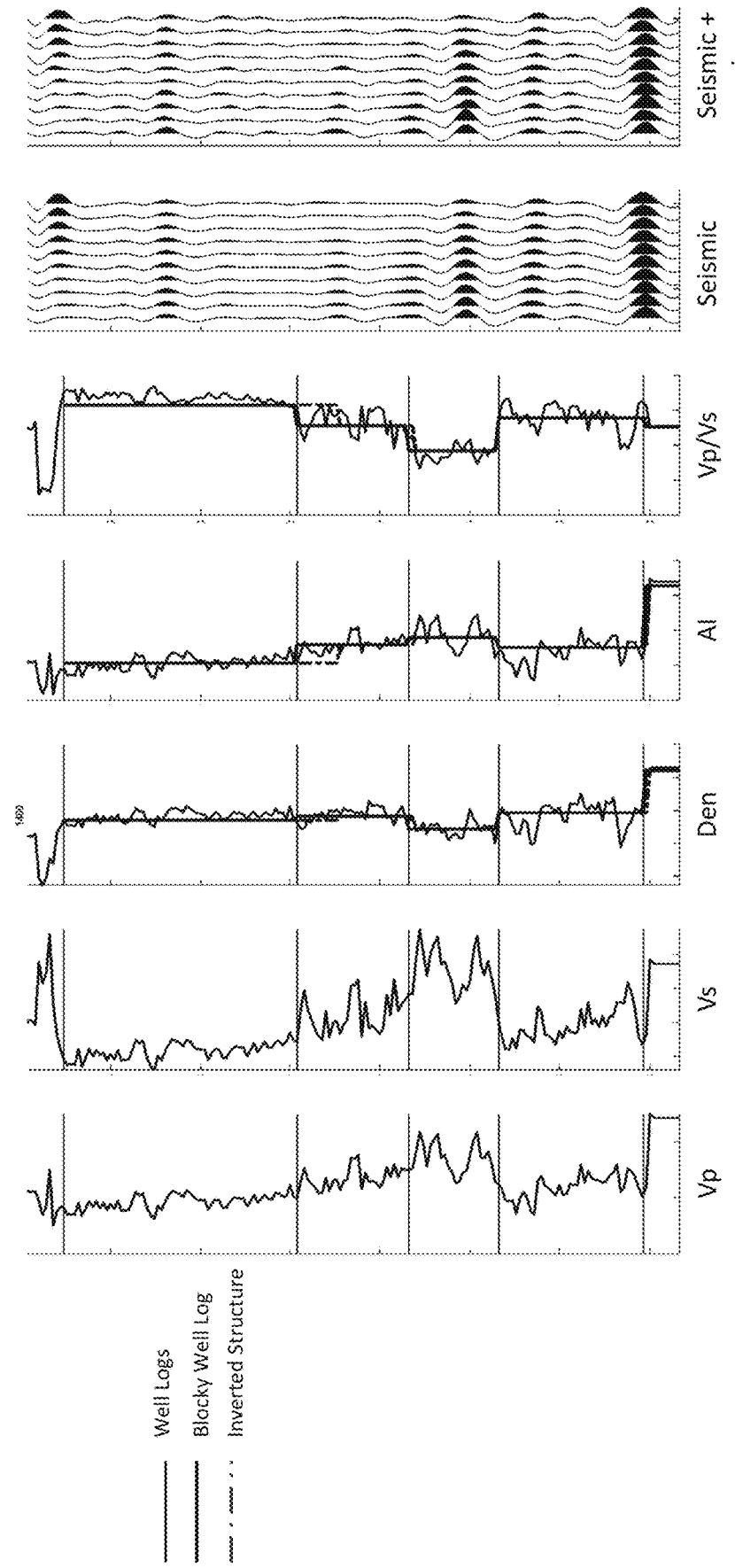
FIG. 13 illustrates an example of a result from a method for reservoir structure characterization.
Figure 14:
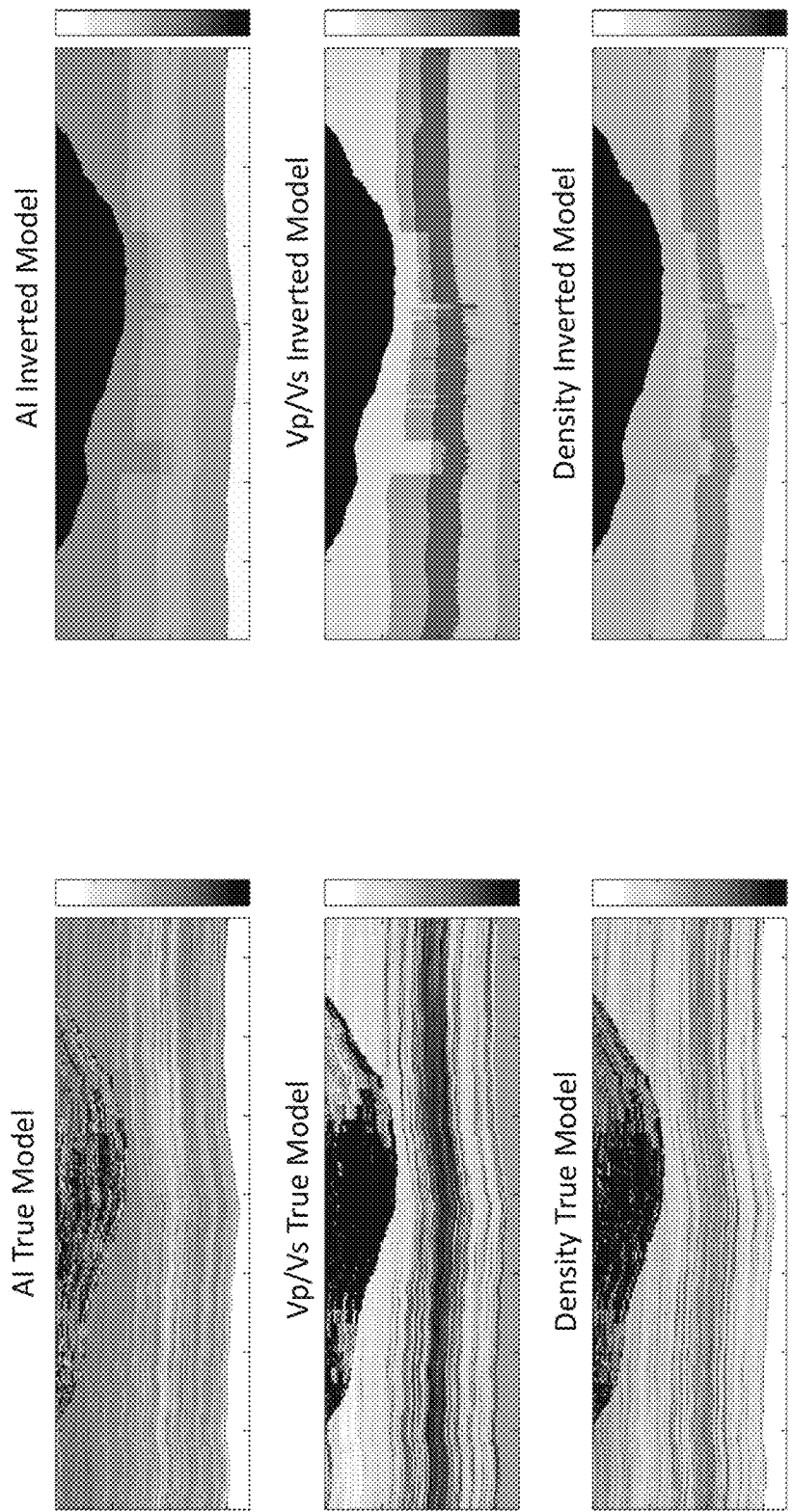
FIG. 14 illustrates an example of a result from a method for reservoir structure characterization.

The robustness of this method is demonstrated by the example shown in FIG. 10, which adds noise to the synthetic seismic data before running method 200. For this case, FIG. 11, FIG. 12, and FIG. 13 show an example of the inversion result compared with the well logs and blocky well representations. FIG. 14 compares the true models with the result of method 200 for the example shown in FIGS. 10-13.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of reservoir structure characterization, comprising:
    a. obtaining well logs and seismic data representative of a subsurface volume of interest including a reservoir structure;
    b. performing facies classification and stratigraphic sequencing on the well logs to identify a plurality of layers;
    c. estimating wavelets from the seismic data and using the wavelets to tie synthetic seismograms from well logs to the seismic data;
    d. determining a mean value for each elastic property in each of the plurality of layers of the well logs and assigning the mean value to each of the plurality of layers to generate blocky well logs;
    e. using the wavelets to attempt to tie synthetic seismograms from the blocky well logs to the seismic data;
    f. defining facies-dependent properties based on the blocky well logs;
    g. performing global optimization using the facies-dependent properties and the seismic data to find physical thicknesses of the layers across the subsurface volume of interest;
    h. mapping the reservoir structure based on the global optimization to generate a map of the reservoir structure, wherein the mapping connects the physical thicknesses of the layers across the subsurface volume of interest; and
    i. using the map of the reservoir structure to identify hydrocarbon deposits and produce hydrocarbons from the hydrocarbon deposits.

2. The method of claim 1 wherein, if the attempt to tie the blocky well logs to the seismic data does not work, the method repeats the performing facies classification and stratigraphic sequencing, the estimating wavelets, and the determining the mean value until the blocky well logs do tie to the seismic data.

3. A computer system, comprising:
    one or more processors;
    memory; and
    one or more programs, wherein the one or more programs are stored in the memory and configured to be executed by the one or more processors, the one or more programs including instructions that when executed by the one or more processors cause the system to:
    a. obtain well logs and seismic data representative of a subsurface volume of interest including a reservoir structure;
    b. perform facies classification and stratigraphic sequencing on the well logs to identify a plurality of layers;
    c. estimate wavelets from the seismic data and using the wavelets to tie synthetic seismograms from well logs to the seismic data;
    d. determine a mean value for each elastic property in each of the plurality of layers of the well logs and assigning the mean value to each of the plurality of layers to generate blocky well logs;
    e. use the wavelets to attempt to tie synthetic seismograms from the blocky well logs to the seismic data;
    f. define facies-dependent properties based on the blocky well logs;

g. perform global optimization using the facies-dependent properties and the seismic data to find physical thicknesses of the layers across the subsurface volume of interest;
h. map the reservoir structure based on the global optimization to generate a map of the reservoir structure, wherein the mapping connects the physical thicknesses of the layers across the subsurface volume of interest; and
i. use the map of the reservoir structure to identify hydrocarbon deposits and produce hydrocarbons from the hydrocarbon deposits.

4. A non-transitory computer readable storage medium storing one or more programs, the one or more programs comprising instructions, which when executed by an electronic device with one or more processors and memory, cause the device to;
a. obtain well logs and seismic data representative of a subsurface volume of interest including a reservoir structure;
b. perform facies classification and stratigraphic sequencing on the well logs to identify a plurality of layers;
c. estimate wavelets from the seismic data and using the wavelets to tie synthetic seismograms from well logs to the seismic data;
d. determine a mean value for each elastic property in each of the plurality of layers of the well logs and assigning the mean value to each of the plurality of layers to generate blocky well logs;
e. use the wavelets to attempt to tie synthetic seismograms from the blocky well logs to the seismic data;
f. define facies-dependent properties based on the blocky well logs;
g. perform global optimization using the facies-dependent properties and the seismic data to find thicknesses of the layers across the subsurface volume of interest;
h. map the reservoir structure based on the global optimization to generate a map of the reservoir structure, wherein the mapping connects the physical thicknesses of the layers across the subsurface volume of interest; and
i. use the map of the reservoir structure to identify hydrocarbon deposits and produce hydrocarbons from the hydrocarbon deposits.

* * * * *